Aug. 19, 1952     P. PANHARD     2,607,639
CONNECTING ROD MOUNTING
Filed July 18, 1947

Inventor
Paul Panhard
By Robert E. Burns
Attorney

Patented Aug. 19, 1952

2,607,639

UNITED STATES PATENT OFFICE 2,607,639

CONNECTING ROD MOUNTING

Paul Panhard, Paris, France, assignor to Societe Anonyme des Anciens Etablissements Panhard et Levassor, Paris, France, a corporation of France Application July 18, 1947, Serial No. 761,867
In France August 7, 1946

6 Claims. (Cl. 308—206)

The difficulties that are met with when connecting rods are to be mounted antifrictionally are well known.

Where said rods are mounted on touching rollers the friction between the latter brings about wear and consequently backlash in operation.

Indeed, it has been proposed to interpose between two successive rollers needles of very slightly less diameter which by reversing the movement eliminate most of the friction.

However, the result of this arrangement is to eliminate one half of the rollers and consequently to increase the bearing pressures, which brings about another cause of wear.

In view of the formula $C = KZ^{2/3} D_w L_w$ (in which C is the loading capacity, K is a constant, Z is the number of rollers, $D_w$ is the diameter of the rollers and $L_w$ is the length of the rollers), with a given crankpin diameter, it would be desirable to increase the diameter of the rollers in order to increase the loading capacity. However, as the diameter of the rollers increases with respect to the diameter of the crankpin, the component C by which the intermediate roller is pressed against the outer race by the effect of the forces transmitted by the adjacent rollers becomes more and more considerable so that the advantage attending the increase in the diameter of the rollers is soon lost again.

It has also been proposed to provide the rollers with cages; yet, since said cages have to resist the differential stresses set up by the rollers, they must be extremely strong and considerably reduce the number and length of the rollers.

This invention has for its object an improved mounting arrangement in which all these inconveniences are done away with; it consists essentially in using distance rollers whose diameter is slightly less than that of the carrying rollers so that with the distance roller resting on the crankpin the centre of said distance roller is extremely close to the line through the centres of the adjacent rollers; this centre may be located slightly below said line in order to balance the centrifugal force acting upon said distance roller.

Several methods may be employed to keep the distance roller in correct position. For instance, a light cage with a U-shaped section provided with apertures for the accommodation of the rollers may be provided, the bar between the two apertures providing an abutment of the distance roller.

As embodiment of this invention is shown by way of example in the appended drawing.

Figure 1:
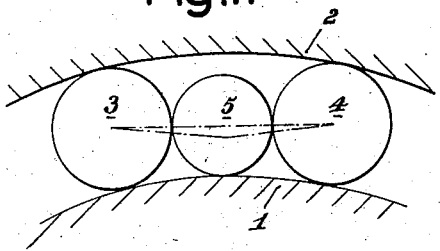
Figure 1 is a diagrammatical view.

Arranged between the crankpin 1 and the small end 2 of the connecting rod are bearing rollers 3 and 4 between which are interposed distance rollers 5 of decidedly smaller diameter; the centre of the distance roller 5 is adjacent to and slightly below the line through the centres of rollers 3 and 4, as shown schematically in Fig. 1.

Figure 3:
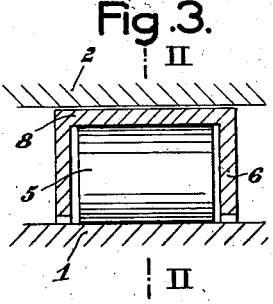
Figures 2 to 4 illustrate an embodiment in cross-sectional views taken on lines II—II in Fig. 3 and III—III in Fig. 2 respectively and in plan view.
Figure 2:
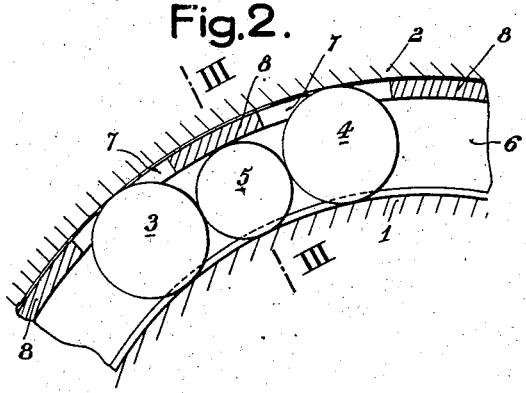
Figure 4:
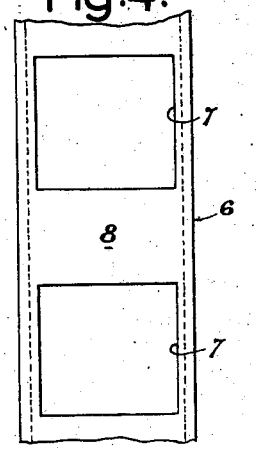

In the embodiment illustrated in Figs. 2 to 4 a cage 6 which is very light in weight and which has a U-shaped section retains the distance rollers 5 in the correct position; cut in the cylindrical peripheral wall of said cage are windows 7 through which project the rollers 3, 4 which are pressed between the crankpin 1 and the small end 2 while the bars 8 provided between the windows 7 serve to keep the distance rollers 5 in position.

As shown in Fig. 4, the width of the windows or openings 7 in an axial direction is slightly less than the distance between the radial flanges of the cage 6. The width of the bars 8 in a circumferential direction is at least as great as the diameter of the distance rollers.

Thus, for instance, the rollers 3 and 4 may have a diameter of 5 mm., the distance rollers a diameter of 3.8. mm. and the cage a thickness of 1 mm.

The flanges of said cage may advantageously guide the carrying rollers.

Said cage, which is not subjected to the stresses set up between the carrying rollers, which stresses are transmitted by the distance rollers, may be extremely light in weight, for instance made of light metal.

Although the antifriction mounting according to the invention is designed more especially for the mounting of connecting rod small ends it may of course find many other applications.

What I claim as my invention and desire to secure by Letters Patent is:

1. A roller bearing for use more especially as a big end bearing in high-speed internal combustion engines and comprising an inner raceway, an outer raceway, at least one row of load-supporting rollers interposed between the two said raceways, distance rollers in each row to separate each load-supporting roller from the next one, a U-sectioned cage provided with windows allowing said load-supporting rollers to project to its outside and arranged outside the lines through the centers of said load-supporting rollers and adapted to keep said distance rollers in position with their centers disposed slightly inwardly from said lines in a direction towards the center of the bearing, wherein the diameter of said distance rollers is so related to that of the said load-carrying rollers that with the centers of the former located inwardly of, yet close to, the line through the centers of the latter, said distance rollers are loosely guided by the inner raceway and similarly guided by the solid portion of the said cage, the thickness of which is substantially equal to the difference between the diameters of the load-supporting rollers and of the distance rollers with the usual clearances.

2. A roller bearing for use more especially as a big end bearing in high-speed internal combustion engines and comprising an inner raceway, an outer raceway, at least one row of load-supporting rollers interposed between the two said raceways, distance rollers in each row to separate each load-supporting roller from the next one, a U-sectioned cage provided with windows allowing said load-supporting rollers to project to its outside and arranged outside the lines through the centers of said load-supporting rollers and adapted to keep said distance rollers in position with their centers disposed slightly inwardly from said lines in a direction towards the center of the bearing, wherein the diameter of said distance rollers is so related to that of said load-carrying rollers that with the centers of the former located inwardly of, yet close to, the line through the centers of the latter, said distance rollers are loosely guided by the inner raceway and similarly by the solid portion of said cage, the thickness of which is substantially equal to the difference between the diameters of the load-supporting rollers and of the distance rollers with the usual clearances and wherein the solid portions between successive windows in the roller-keeping cage are no narrower in a circumferential direction than the diameter of the distance rollers.

3. A roller bearing for connecting rod and similar applications comprising an outer race ring providing a cylindrical outer raceway, an inner race ring providing a cylindrical inner raceway concentric with said outer raceway, a circular cage fitted freely between said inner and outer raceways and including a cylindrical portion and spaced radial flanges, bearing rollers between said inner and outer raceways and between said flanges of said cage, distance rollers between said flanges of said cage and between said bearing rollers, said bearing rollers and said distance rollers bearing upon said inner cylindrical raceway, said cylindrical portion of said cage being provided with openings through which said bearing rollers project into coaction with said outer raceway, said cylindrical portion of said cage retaining said distance rollers from outward radial displacement, and said distance rollers having such a diameter that each distance roller has its axis close to the plane containing the axes of the two adjacent bearing rollers, the thickness of the cylindrical portion of the cage being substantially equal to the difference between the diameter of the bearing rollers and that of the distance rollers.

4. A roller bearing according to claim 3, wherein the width of the apertures in the cylindrical portion of the cage is less than the distance between said flanges.

5. A roller bearing according to claim 3, wherein the bearing rollers and distance rollers are of substantially equal length.

6. A roller bearing according to claim 3, in which the spacing between the two spaced radial flanges is substantially equal, with suitable working play, to the length of the bearing rollers.

PAUL PANHARD.

REFERENCES CITED

The following references are of record in the file of this patent:

UNITED STATES PATENTS

| Number | Name | Date |
|---|---|---|
| 391,234 | Elliott | Oct. 16, 1888 |
| 1,022,163 | Upton | Apr. 2, 1912 |
| 1,972,355 | Peters | Sept. 4, 1934 |
| 2,120,533 | Tillson | June 14, 1938 |

FOREIGN PATENTS

| Number | Country | Date |
|---|---|---|
| 14,855 | Great Britain | 1896 |